June 23, 1959 J. RAWLEY 2,891,422
TRANSMISSION
Filed Oct. 29, 1954 3 Sheets-Sheet 1

Inventor
Joseph Rawley
By T. L. Chisholm
Attorney

June 23, 1959  J. RAWLEY  2,891,422
TRANSMISSION
Filed Oct. 29, 1954  3 Sheets-Sheet 3

Inventor
Joseph Rawley
By T. L. Chisholm
Attorney

United States Patent Office 2,891,422
Patented June 23, 1959

2,891,422

TRANSMISSION

Joseph Rawley, Davison, Mich., assignor to General Motors Corporation, Detroit, Mich., a corporation of Delaware Application October 29, 1954, Serial No. 465,660

16 Claims. (Cl. 74—754)

This invention relates to a transmission control mechanism and more particularly to an adjustable linkage for controlling the control element of a transmission.

The transmission control linkage located on the transmission housing has an external portion outside of the housing connected by a suitable remote control to the manual control handle and an internal portion located within the transmission housing connected to the controlled terminal transmission control elements. The manual control handle is connected to move the control linkage consecutively through a number of control stations. The control linkage which has a fixed connection to a brake actuating element of the transmission has an adjustable detent located within the transmission housing to properly locate the control stations of the control linkage with respect to the brake actuating element so that the brake is actuated when the control linkage is at the brake control station. The transmission control valve is adjustably connected to the control linkage so that the valve is properly positioned at each control station of the control linkage. The adjusting mechanism for the detent is located on the outside of the transmission housing and the adjusting mechanism for the valve connection is located within the transmission oil pan to permit access for adjusting.

An object of the invention is to provide a transmission control linkage having an adjustable detent mechanism and an adjustable linkage providing a connection to a transmission control member located within the transmission housing.

Another object of the invention is to provide a transmission control mechanism having a detent cam and a detent latch resiliently engaging the detent cam with provision for adjusting the position of the detent latch relative to the detent cam located externally of the transmission housing.

Another object of the invention is to provide a spring actuated detent latch located on a support within a transmission housing and cooperating with a detent cam located within a transmission housing with the detent latch mounted on a shaft extending through the transmission housing to permit adjustment of the position of the roller relative to the position of the detent cam from a point outside the transmission housing.

These and other objects of the invention will be more fully understood from the following description of the preferred embodiment of my invention illustrated in the accompanying drawings.

Figure 1:
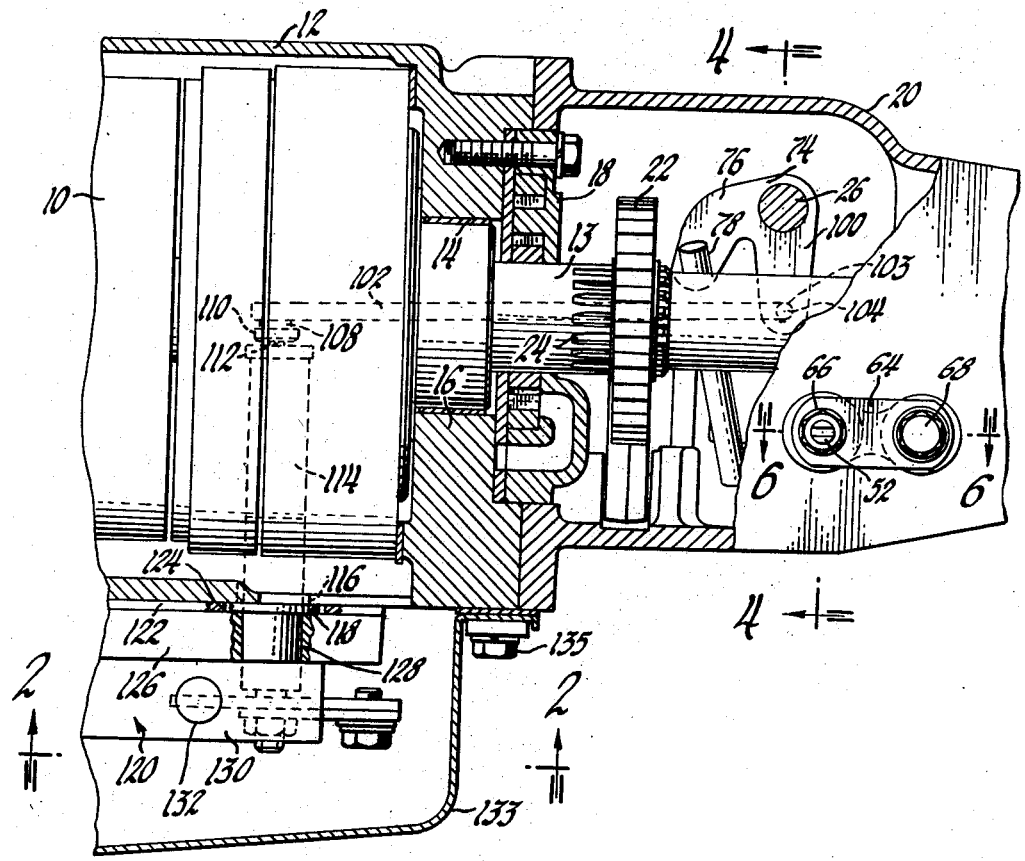
Fig. 1 is a partial sectional elevation with parts broken away and in section to show the details of my control linkage.
Figure 2:
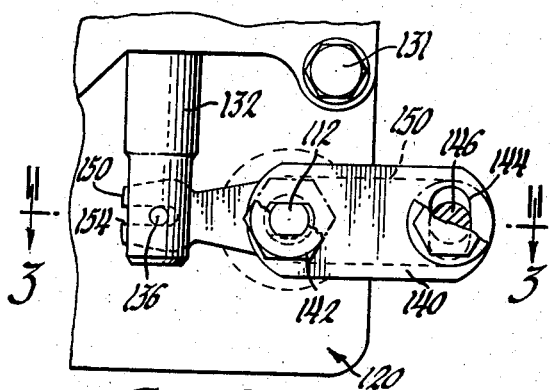
Fig. 2 is an enlarged partial sectional view of Fig. 1 on a line 2—2.
Figure 3:
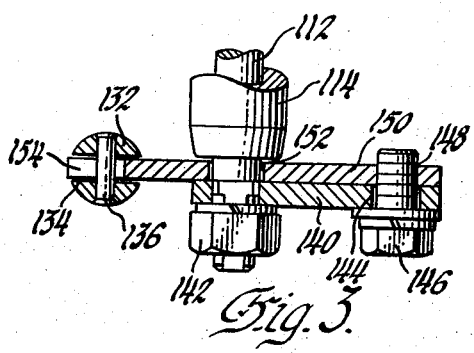
Fig. 3 is a partial sectional view of Fig. 2 on a line 3—3.

The invention provides an adjustable control mechanism or linkage mounted on the transmission housing and connecting the remote control actuated by the manual control handle and the control element of a manual or automatic transmission. A specific embodiment of this control linkage is illustrated in conjunction with the control mechanism for an automatic transmission employing a torque converter and a two-speed and reverse gear set. A transmission of this type is more fully described in application filed January 23, 1950, by Oliver K. Kelley, Serial Number 146,723.

The control linkage illustrated in conjunction with a transmission 10 having a torque converter and a high, low and reverse drive planetary gear set, is located in the forward portion 12 of the transmission housing. The transmission 10 drives the driven shaft 13 which is rotatably mounted in suitable bearings 14 in the rear wall 16 of the forward portion 12 of the transmission housing. The pump 18 supplies fluid under pressure for lubrication and control and is driven by the shaft 13 and mounted concentrically about the shaft on the rear face of the rear wall 16 of the front tranmission housing portion 12. The parking brake gear 22 is secured to the shaft 13 by splines 24. The shaft 13 extends rearwardly through the rear portion 20 of the transmission housing and is connected to the usual drive shaft (not shown) for the rear wheels.

Figure 4:
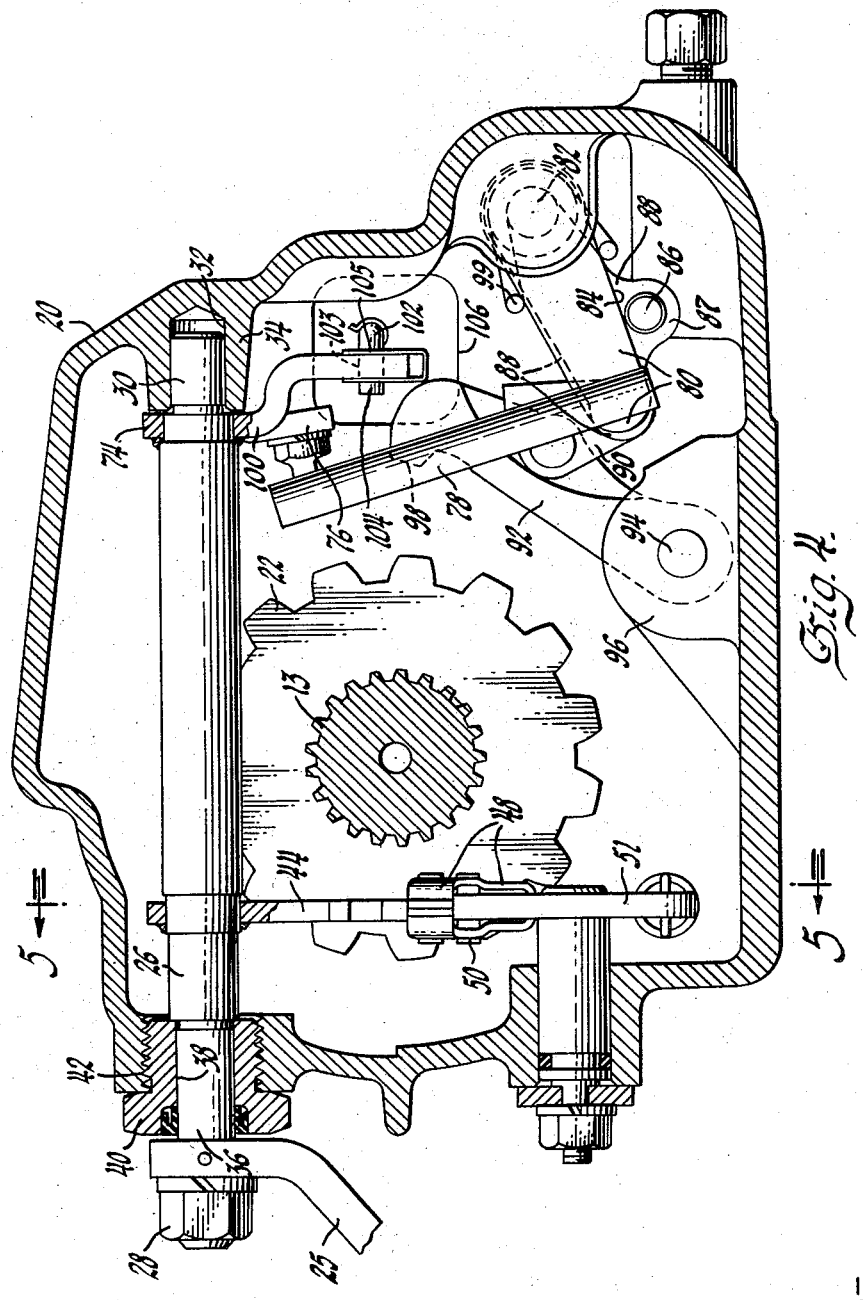
Fig. 4 is an enlarged sectional view of Fig. 1 on a line 4—4.
Figure 5:
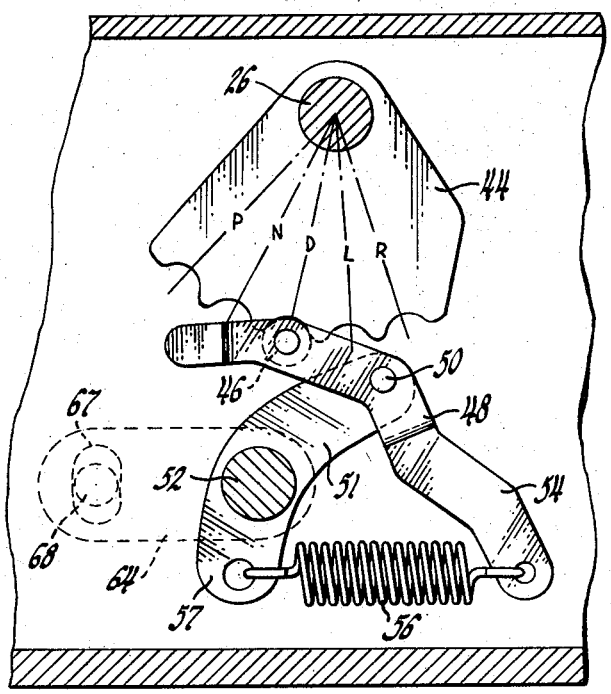
Fig. 5 is a partial sectional view of Fig. 4 on a line 5—5.
Figure 6:
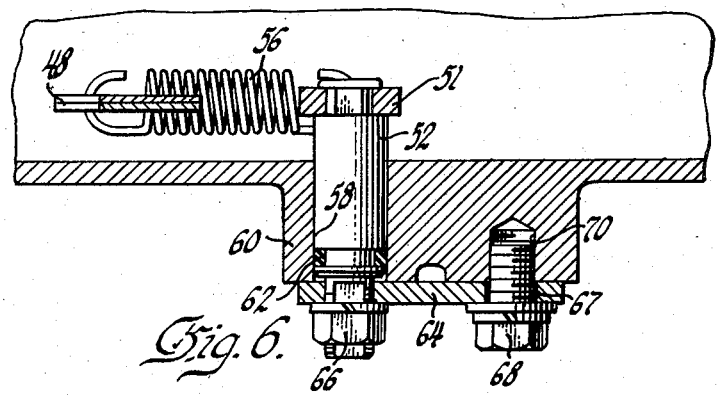
Fig. 6 is an enlarged partial sectional view of Fig. 1 on the line 6—6.

The transmission control is generally actuated by a manual control handle or lever mounted beneath the steering wheel and rotated through four or five control stations or positions about the steering wheel. The control movement of the manual control handle is transferred by a suitable linkage often consisting of a tube extending coaxially with the steering wheel column and a rod to the crank 25. The crank 25 is fixed or keyed to the shaft 26 and secured thereto by the lock washer and nut 28. The shaft 26 is rotatably mounted in the upper portion of the transmission housing. The inner end of the shaft 26 has a cylindrical bearing portion 30 fitting within the bore 32 formed within the boss 34 in the wall of the rear portion 20 of the transmission housing. The other end of the control shaft 26 adjacent the crank 25 has a cylindrical bearing portion 36 rotatably mounted within the bore 38 formed in the plug 40 which is threadably secured in the threaded opening 42 in the other side of the transmission housing 20. As best illustrated in Figs. 4 and 5, the control shaft 26 has adjacent the side transmission housing where the operating crank 25 is located, a detent sector cam 44 secured to the shaft. The detent cam has at its circular perimeter a notch for each of the control positions of the control linkage. In this instance, as illustrated in Fig. 5, the detent sector 44 has a notch for park, neutral, drive, low and reverse positions to which a linkage may be moved. The detent latch consisting of a roller 46, which cooperates with the notches in the detent sector 44, is mounted on a bell crank lever 48 adjacent the end near the cam. The bell crank lever is centrally pivoted by a pin 50 to one end of supporting lever 51 which is fixed at the central portion to the adjusting shaft 52. The other end 54 of the bell crank lever 48 remote from the roller 46 and the end 57 of the lever 51 remote from lever 48 are suitably apertured to receive the ends of spring 56. The spring 56 is in tension and tends to move the ends of the levers 48 and 51 together in order to urge the roller detent 46 into the notches of sector cam 44. The shaft 52 is rotatably mounted in a bore 58 in a boss 60 located in the adjacent side wall of the housing portion 20. An O-ring 62 is located in a suitable groove in shaft 52 in order to seal the shaft in the bore 58 to prevent leakage of oil. An adjusting arm 64 is fixed to the shaft 52 outside the transmission housing by suitable flats and secured thereon by the lock washer and nut 66. The arm 64 has at the end remote from the shaft 52 a circumferentially extending slot 67. A bolt 68 extends through the slot and into the threaded bore 70 in the boss 60. When the bolt 68 is loosened, the arm 64 may then be rotated within the limits of the slot 67 and since the arm 64 is fixed to the shaft 52 and the shaft is fixed to the arm 51, the detent roller 46 may be adjusted substantially circumferentially or tangentially with respect to the detent sector 44. The bolt 68 is tightened to clamp arm 64 and secure the roller 46 in any position.

The control shaft 26 is connected to the terminal transmission control elements through the bell crank lever 74 which is secured to the other end of the shaft 26. As illustrated in the above Kelley application SN 146,723 the short arm 76 of the bell crank lever 74 is pivotally connected to a rod 78 which extends downwardly and is pivotally connected to the parking brake actuating lever 80. The actuating lever 80 is pivotally mounted on the shaft 82 fixed in the housing and has a flat lower edge surface 84 engaging the pin 86 secured to the bulbous protrusion 87 on the mid-portion of the lower edge of the toggle operating lever 88. The lever 88 is pivoted at one end to pivot shaft 82 and at the other end to the toggle link 90 which is pivotally connected to the parking brake pawl 92. The parking brake pawl 92 is pivoted at its lower end by a pin 94 to a boss 96 secured to or integral with the lower wall of the transmission housing. The upper portion of the parking brake pawl has a dog 98 formed thereon which fits into the parking brake gear teeth 22 to lock or brake the vehicle by preventing movement of the transmission output shaft 13. A coil spring 99 is positioned around shaft 82, one end engaging the upper edge of the actuating lever 80 and the other end engaging the lower edge of the operating lever 88 to hold the pin 86 on the operating lever 88 in engagement with the actuating lever 80 so that the spring moves the operating lever and the brake pawl 92 when permitted to do so by actuating lever 80.

In order to provide a connection to the other terminal transmisson control element, valve 132, the control shaft 26 also rotates the other arm 100 of the bell crank lever 74. The arm 100 is pivotally connected at its end to the rod 102. The rod 102 has a bent end 104 projecting perpendicularly from the connecting rod 102 and rotatably fitting in the aperture 103 in the end of the arm 100 and retained therein by a spring clip 105. The connecting rod 102 passes through the opening 106 in the rear wall 16 in the forward portion 12 of the transmission housing and is pivotally connected to the crank 110 as best shown in Figs. 1 and 4 by a pin 108 secured to the free end of crank 110. The crank 110 is fixed to a shaft 112 which extends through a suitable shaft support or bearing member 114 which extends downwardly in the transmission housing and through the lower wall to the point adjacent the valve body 130. The support 114 has a tubular shape and extends through an aperture 116 in the lower wall of the transmission housing 12 and has a centrally located flange 118 engaging the lower surface of the transmission housing. The valve assembly 120 has a plate 122 engaging the lower surface of the transmission housing 12 which has an aperture 124 large enough to receive the flange 118. The inner valve body 126 has an aperture 128 fitting over the support 114 so that the inner annular surface around the aperture engages the flange 118 to lock the support in position to engage the lower surface of the transmission housing. The outer valve body 130 is positioned on the inner valve body 126 and has a bore therein extending perpendicularly to the shaft 112 in which the valve 132 is slidably mounted for axial movement. The plate 122, the inner and outer valve body members 126 and 130 are suitably secured to the transmission housing by bolts 131. The valve 132 is a control valve for the transmission and in an automatic transmission it may take the form of a shift control valve illustrated in the above application S.N. 146,723. The valve 132 and its control mechanism is located outside and below the transmission housing within the sump pan 133 removably secured to the transmission housing by bolts 135.

The shift control valve 132 has a slot 134 in one end and a pin 136 traversing the slot. The shaft 112 has at its lower end a fixed crank 140 keyed to the shaft and secured thereon by a nut 142. The outer end of the fixed crank 140 has an arcuate slot 144 which receives the bolt 146 which is threadably secured in an aperture 148 in the free end of the floating crank 150. The floating crank 150 has a central aperture 152 rotatably receiving the shaft 112 therein to rotatably mount the crank 150 on the shaft 112. The other end of the floating crank 150 fits within the slot 134 and has a bifurcated end providing a slot 154 receiving the pin 136.

When the manual control lever which in a typical transmission control is connected to the crank 25 is moved, the crank 25 on the outside of the transmission is also moved to rotate the control mechanism within the transmission including the shaft 26 which extends across the interior of the transmission housing. The shaft 26 has mounted thereon at one side of the transmission a detent cam sector 44 which in cooperation with the detent roller 46 which is urged by the spring 56 into resilient engagement with the sector 44 to provide the operator with the feel of the position or control station in which the manual control mechanism is located. The location of the control stations in which the control shaft 26 is held by the detent roller 46 may be adjusted by adjusting the position of the detent roller 46. Since the detent roller 46 is pivotally mounted by the lever 48 on the lever 51 which in turn is fixed to shaft 52 and adjusting crank 64, the position roller 46 may be moved substantially tangentially of the detent cam and adjusted by loosening bolt 68 and moving the arm 64 as permitted by the slot 67. The roller 46 and the supporting mechanism is then secured in adjusted position by fastening bolt 68. At the other side of the transmission housing, the shaft 26 is rigidly connected to the bell crank lever 74. One arm of the bell crank 76 operates the parking brake. The other arm 100 of the bell crank 74 is connected by a rod 102 to a crank 110 which rotates the transfer shaft 112. Thus the control motion is transferred to the sump below the transmission housing 12 where the shift control valve 132 is located. The transfer shaft 112, when connected to the valve by the crank 140 which is fixed to the shaft, and the floating crank 150 which is locked to the fixed crank by bolt 16, moves the valve 132 axially in response to the rotary movement of the shaft 112 effected by the control linkage operated by the crank 25. This control linkage arrangement permits the shift control selector valve and detent mechanism to be set when building the transmission assembly and provides accurate means for making this adjustment. Previous arrangements with detent mechanisms located remotely from the transmission made it difficult to adjust the control mechanism with the required accuracy, or to maintain the control adjustment in view of the relative movements of the vehicle such as the transmission housing and the steering column. The transmission adjustments are set by first loosening all the adjustments and positioning the parking brake pawl in the park position and checking to see if the detent lever spring and roller assembly is properly seated with the detent roller in the parking brake notch of the detent cam sector. When the roller has properly seated, the clamping bolt 68 is made tight to lock the roller in position. Then with the clamping bolt 146 still loose, position the shift control valve 132 in the park position and clamp bolt 146. The transmission linkage is then adjusted. It will be seen that this adjustment may be made very easily, when the vehicle is in service, since the detent adjustment can be made from the exterior of the transmission and it will only be necessary to remove the transmission oil pan to make the valve adjustment.

The specific embodiment described above is illustrative of the invention. It will be apparent to those skilled in the art that numerous modifications may be made within the scope of the appended claims.

I claim:

1. In a transmission control mechanism, a support, control means having a rotatable portion mounted on said support for rotary movement, a first terminal transmission control element fixedly connected to said control means for movement with said control means for effecting a change in transmission operation, a detent cam secured to said control means for movement in a path by said control means, a shaft mounted on said support, a first lever fixed to said shaft and having one end adjacent said cam, a second lever pivoted to said first lever, a detent member mounted on said second lever, said detent cam and said detent member having interengaging portions to provide a friction lock between the cam and member to position one with respect to the other, a spring connecting said first and second levers to resiliently urge said detent member into engagement with said cam, clamp means to adjustably secure said shaft to said support to adjustably locate said detent member along said path of said cam to properly position said first transmission control element, a crank fixed to said rotatable portion of said control means, a second crank having a central portion rotatably mounted on said rotatable portion of said control means, means adjustably connecting said second crank to said first crank at points having relative movement, a second terminal transmission control element mounted in said support for movement for effecting a change in transmission operation, and means connecting said second crank to said second terminal transmission control element to adjustably connect said control means and said second terminal transmission control element to provide adjustment for proper coordination of said first and second transmission control elements with respect to said control means.

2. In a transmission control mechanism, a transmission housing including a support, control means having a portion located inside and a portion located outside said transmission housing and having a rotary portion mounted on said support for rotary movement, a first terminal transmission control element located inside said housing and fixedly connected to said control means for movement with said control means, a detent cam located inside said housing and secured to said control means for movement in a path by said control means, a shaft mounted on said support having a portion inside and a portion outside said housing, a first lever fixed to said shaft portion inside said housing and having one end adjacent said cam, a second lever pivoted to said first lever, a detent member mounted on said second lever, said detent cam and said detent member having interengaging portions to provide a friction lock between the cam and member to position one with respect to the other, a spring connecting said first and second levers to resiliently urge said detent member into engagement with said cam, clamp means located outside of said housing and engaging said shaft portion outside of said housing to adjustably secure said shaft to said support to adjustably locate said detent member along said path of said cam to properly position said first transmission control element, a crank fixed to said rotatable portion of said control means, a second crank having a central portion rotatably mounted on said rotatable portion of said control means, means adjustably connecting said second crank to said first crank at points having relative movement, a second terminal transmission control element, and means connecting said second crank to said second terminal transmission control element to adjustably connect said control means and said second terminal transmission control element to provide adjustment for proper coordination of said first and second transmission control elements with respect to said control means.

3. In a transmission control mechanism, a transmission housing including a support, control means having a portion located inside and a portion located outside said transmission housing and having a rotary portion mounted on said support for rotary movement, a first terminal transmission control element located inside said housing and fixedly connected to said control means for movement with said control means, a detent cam located inside said housing and secured to said control means for movement in a path by said control means, a shaft mounted on said support having a portion inside and a portion outside said housing, a first lever fixed to said shaft portion inside said housing and having one end adjacent said cam, a second lever pivoted to said first lever, a detent member mounted on said second lever, said detent cam and said detent member having interengaging portions to provide a friction lock between the cam and member to position one with respect to the other, a spring connecting said first and second levers to resiliently urge said detent member into engagement with said cam, clamp means located outside of said housing and engaging said shaft portion outside of said housing to adjustably secure said shaft to said support to adjustably locate said detent member along said path of said cam to properly position said first transmission control element, a crank fixed to said rotatable portion of said control means and located outside of said housing, a second crank located outside of said housing and having a central portion rotatably mounted on said rotatable portion of said control means, means adjustably connecting said second crank to said first crank at points having relative movement, a second terminal transmission control element, and means connecting said second crank to said second terminal transmission control element to adjustably connect said control means and said second terminal transmission control element to provide adjustment for proper coordination of said first and second transmission control elements with respect to said control means.

4. In a transmission control mechanism, a support, control means having a rotatable portion mounted on said support for rotation about an axis, a first terminal transmission control element fixedly connected to said control means for movement with said control means, a detent sector secured to said control means for rotation in a path about said axis and having a plurality of recesses therein spaced about said axis, a shaft mounted on said support parallel to the axis of said control means, a first lever having a central portion fixed to said shaft and having one end adjacent said sector, a second lever pivoted between its ends to said one end of said first lever, a roller mounted on said second lever adjacent one end and engaging said recesses in said sector, a spring connecting under tension said other ends of said first and second levers, clamp means to adjustably secure said shaft to said support to adjustably locate said roller along said path of said sector to properly position said first transmission control element, a crank fixed to said control means, a second crank having a central portion rotatably mounted on said rotatable portion of said control means, means adjustably connecting said second crank to said first crank at points having relative movement, a second terminal transmission control element, and means connecting said second crank to said second terminal transmission control element to adjustably connect said control means and said second terminal transmission control element to provide adjustment for proper coordination of said first and second transmission control elements with respect to said control means.

5. In a transmission control mechanism, a transmission housing including a support, control means having a rotatable portion mounted inside said housing and on said support for rotation about an axis, a first terminal transmission control element fixedly connected to said control means for movement with said control means and located inside said housing, a detent sector secured to said control means inside said housing for rotation in a path about said axis and having a plurality of recesses therein spaced about said axis, a shaft mounted on said support parallel to the axis of said control means having a portion inside and a portion outside of said housing, a first lever having a central portion fixed to said shaft inside said housing and having one end adjacent said sector, a second lever pivoted between its ends to said one end of said first lever, a roller mounted on said second lever adjacent one end in said path and engaging said recesses in said sector, a spring connecting under tension said other ends of said first and second levers, clamp means located outside of said housing and engaging said shaft portion outside of said housing to adjustably secure said shaft to said support to adjustably locate said roller along said path of said sector to properly position said first transmission control element, a crank fixed to said control means, a second crank having a central portion rotatably mounted on said rotatable portion of said control means, means adjustably connecting said second crank to said first crank at points having relative movement, a second terminal transmission control element and means connecting said second crank to said second terminal transmission control element to adjustably connect said control means and said second terminal transmission control element to provide adjustment for proper coordination of said first and second transmission control elements with respect to said control means.

6. In a transmission control mechanism, a transmission housing including a support, control means having a rotatable portion mounted inside and outside said housing and on said support for rotation about an axis, a first terminal transmission control element fixedly connected to said control means for movement with said control means and located inside said housing, a detent sector secured to said control means inside said housing for rotation in a path about said axis and having a plurality of recesses therein spaced about said axis, a shaft mounted on said support parallel to the axis of said control means having a portion inside and a portion outside of said housing, a first lever having a central portion fixed to said shaft inside said housing and having one end adjacent said sector, a second lever pivoted between its ends to said one end of said first lever, a roller mounted on said second lever adjacent one end and engaging said recesses in said sector, a spring connecting under tension said other ends of said first and second levers, clamp means located outside of said housing and engaging said shaft portion outside of said housing to adjustably secure said shaft to said support to adjustably locate said roller along said path of said sector to properly position said first transmission control element, a crank located outside of said housing and fixed to said control means, a second crank located outside of said housing and having a central portion rotatably mounted on said rotatable portion of said control means, means adjustably connecting said second crank to said first crank at points having relative movement, a second terminal transmission control element, and means connecting said second crank to said second terminal transmission control element to adjustably connect said control means and said second terminal transmission control element to provide adjustment for proper coordination of said first and second transmission control elements with respect to said control means.

7. In a transmission control mechanism, a support, control means having a portion mounted on said support for movement, a first terminal transmission control element fixedly connected to said control means for movement with said control means for effecting a change in transmission operation, a first detent member secured to said control means for movement in a path by said control means, detent means mounted on said support having a second detent member located in said path engaging said first detent member, said first and second detent members having engaging portions to provide a friction lock between the members to position said first member with respect to said second member, clamp means engaging said detent means to adjustably secure said second detent member to said support to adjustably locate said second detent member along said path of movement of said first detent member to properly position said first detent member and said first transmission control element, a second terminal transmission control element mounted on said support for movement for effecting a change in transmission operation, and an adjustable linkage means adjustably connecting said control means to said second terminal transmission control element to adjustably connect said control means and said second terminal transmission control element to provide adjustment for proper coordination of said first and second transmission control elements with respect to said control means.

8. In a transmission control mechanism, a transmission housing having a portion providing a support and a removable sump attached to the outside bottom surface, control means having a portion located inside and a portion located outside said housing and having a portion mounted on said support for movement, a first terminal transmission control element located inside said housing and fixedly connected to said control means for movement with said control means for effecting a change in transmission operation, a first detent member located inside said housing and secured to said control means for movement in a path by said control means, detent means mounted on said support having a second detent member inside said housing in said path and connected to an adjusting portion outside said housing, said first and second detent members having engaging portions to provide a friction lock between the members to position said first member with respect to said second member, clamp means located outside of said housing and engaging said adjusting portion of said detent means outside said housing to adjustably secure said adjusting portion to said support to adjustably locate said second detent member along said path of movement of said first detent member to properly position said first detent member and said first transmission control element, a second terminal transmission control element mounted on said support for movement for effecting a change in transmission operation and located in said sump and a linkage having adjusting means located in said sump and adjustably connecting said control means to said second terminal transmission control element to adjustably connect said control means and said second terminal transmission control element and said adjusting means providing adjustment for proper coordination of said first and second transmission control elements with respect to said control means.

9. In a transmission control mechanism, a support, control means having a portion mounted on said support for movement, a first terminal transmission control element fixedly connected to said control means for movement with said control means for effecting a change in transmission operation, a first detent member secured to said control means for movement in a path by said control means, a shaft mounted on said support, a first lever fixed to said shaft, a second lever pivoted to said first lever, a second detent member mounted on said second lever in said path, a spring connecting said first and second levers to resiliently urge said second detent member into engagement with said first detent member, said first and second detent members having engaging portions to provide a friction lock between the members to position said first member with respect to said second member, clamp means to adjustably secure said shaft to said support to adjustably locate said second detent member along said path of movement of said first detent member to properly position said first detent member and first transmission control element, a second terminal transmission control element mounted on said support for movement for effecting a change in transmission operation and a linkage connecting said control means to said second terminal transmission control element having means to readily change a dimension of said linkage to adjustably connect said control means and said second terminal transmission control element to provide adjustment for proper coordination of said first and second transmission control elements with respect to said control means.

10. In a control mechanism, a housing including a support, control means having a portion located inside and a portion located outside said housing and having a portion mounted on said support for movement, a first detent member located inside said housing and secured to said control means for movement in a path by said control means, detent means mounted on said support having a second detent member inside said housing movable in a path substantially coinciding in part with said path of said first detent member and connected to an adjusting portion outside said housing, said first and second detent members having engaging portions to provide a friction lock between the members to position said first member with respect to said second member, and clamp means located on the outside of said housing and engaging said adjusting portion of said detent means outside said housing to adjustably secure said adjusting portion to said support to adjustably locate said second detent member along the path of movement of said first detent member to properly position said first detent member.

11. In a control mechanism, a support, control means having a portion mounted on said support for movement, a first detent member secured to said control means for movement in a path by said control means, a shaft rotatably mounted on said support, a first lever fixed to said shaft for rotation by said shaft, a second lever pivoted to said first lever, a second detent member mounted on said second lever in said path, a spring connecting said first and second levers to resiliently urge said second detent member into engagement with said first detent member, said first and second detent members having engaging portions to provide a friction lock between the members to position said first member with respect to said second member, adjustment and clamp means on said shaft to rotate said shaft and said first and second levers and to adjustably secure said shaft to said support to adjustably locate said second detent member along said path of movement of said first detent member to properly position said first detent member.

12. In a control mechanism, a support, control means having a portion mounted on said support for movement, a first detent member secured to said control means for movement in a path by said control means, a shaft rotatably mounted on said support, a first lever fixed to said shaft for rotation by said shaft and having one end extending toward said first detent member, a second lever centrally pivoted to said one end of said first lever, a second detent member mounted on one end of said second lever in said path, a spring connecting the other end of said first and second levers to resiliently urge said second detent member into engagement with said first detent member, said first and second detent members having engaging portions to provide a friction lock between the members to position said first member with respect to said second member, adjustable clamp means connected to said shaft to rotatably adjust said shaft and connected to said support to adjustably secure said shaft to said support to adjustably locate said second detent member along said path of movement of said first detent member to properly position said first detent member.

13. In a control mechanism, a support, control means having a portion mounted on said support for relative movement with respect to said support, a first detent member fixed on said control means and movable with said control means in a path and having a first detent means on said first detent member movable in said path, a shaft rotatably mounted on said support, a first lever fixed to said shaft for rotation by said shaft, a second lever, a pivot pivoting said second lever to said first lever at a point laterally spaced from said shaft, a second detent means mounted on said second lever at a point laterally spaced in one direction from said pivot and in said path, said first and second detent means being engageable to prevent relative movement of said control means and said second lever, spring means to resiliently urge said second detent means into continuous contact with said first detent member for engagement with said first detent means to provide a detent lock between said first detent member and said second lever to position said first member with respect to said second member, said shaft and first and second levers and spring means being rotatable as a unit to move said second detent means through an adjusting arc substantially coinciding with a portion of said path, and operating and clamp means to rotate said shaft to move said second detent member in said arc along said path of movement of said first detent member to change the detent engagement position of said first and second detent means and to clamp said shaft to said support to hold said adjusted position.

14. In a control mechanism, a support, control means having a portion mounted on said support for relative movement with respect to said support, a first detent member fixed on said control means and movable with said control means in a path and having a first detent means on said first detent member movable in said path, a shaft rotatably mounted on said support, a first lever fixed to said shaft for rotation by said shaft, a second lever, a pivot pivoting said second lever to said first lever at a point laterally spaced from said shaft, a second detent means mounted on said second lever at a point laterally spaced in one direction from said pivot and in said path, said first and second detent means being engageable to prevent relative movement of said control means and said second lever, a spring fixed to said second lever at a point laterally spaced in the opposite direction from said pivot and connected to said first lever at a point laterally spaced from said pivot to resiliently urge said second detent means into continuous contact with said first detent member for engagement with said first detent means to provide a detent lock between said first detent member and said second lever to position said first member with respect to said second member, said shaft and first and second levers and spring being rotatable as a unit to move said second detent means through an adjusting arc substantially coinciding with a portion of said path, and operating and clamp means to rotate said shaft to move said second detent member in said arc along said path of movement of said first detent member to change the detent engagement position of said first and second detent means and to clamp said shaft to said support to hold said adjusted position.

15. In a transmission, a housing for enclosing the transmission drive mechanism, a first terminal transmission control element located within said housing having a control point for controlling the transmission drive mechanism, said housing having a bottom surface, a sump pan removably attached to said bottom surface, a second terminal transmission control element secured to said bottom surface of said housing and located within said sump pan having a control point for controlling the transmission drive mechanism, control means including a portion connected through said housing and fixedly connected to said first terminal transmission control element, a first detent member located within said housing and fixedly secured to said control means for movement in a path by said control means, detent means movably mounted on said housing for adjustment to several adjustment positions and having a second detent member located within said housing and in said path for engagement with said first detent member and having a part located outside said housing, said first and second detent members having engaging portions to provide a detent lock position between said members to position the first member with respect to said second member, clamp means on the outside of said housing connected to said part of said detent means to adjustably secure said second detent member in one of said several adjustment positions in said path of said first detent member to adjust said detent lock position, linkage means located in said pan and said housing connecting said control means and said second terminal transmission control element and having means located in said pan and accessible by removing said pan to readily change the lineal length of said linkage to adjustably connect said control means and said second terminal control element to provide adjustment for proper coordination on said control points of said first and second transmission control elements and detent lock position with respect to said control means.

16. In a transmission, a housing having a wall for enclosing the transmission drive mechanism, a first terminal transmission control element located within said housing having a control point for controlling the transmission drive mechanism, said housing having a bottom surface, a sump pan removably attached to said bottom surface, a second terminal transmission control element secured to said bottom surface of said housing and located within said sump pan having a control point for controlling the transmission drive mechanism, control means including a shaft rotatably mounted in and extending through said wall, means in said housing connecting said shaft to said first terminal transmission control element, a first detent member located within said housing and fixedly secured to said shaft for movement in a path, detent means movably mounted on said wall for adjustment to several adjustment positions and having a second detent member located within said housing and in said path for engagement with said first detent member and having a part located outside said housing, said first and second detent members having engaging portions to provide a detent lock position between said members to position the first member with respect to said second member, clamp means on the outside of said housing connected to said part of said detent means to adjustably secure said second detent member in one of said several adjustment positions in said path of said first detent member to adjust said detent lock position, linkage means located in said pan and said housing connecting said shaft and said second terminal transmission control element and having means located in said pan and accessible by removing said pan to readily change the linear length of said linkage to adjustably connect said control means and said second terminal control element to provide adjustment for proper coordination on said control points of said first and second transmission control elements and detent lock position with respect to said control means.

References Cited in the file of this patent

UNITED STATES PATENTS

| | | |
|---|---|---|
| 711,724 | Janssen | Oct. 21, 1902 |
| 2,355,457 | Mares | Aug. 8, 1944 |
| 2,407,840 | Leonard | Sept. 14, 1946 |
| 2,653,689 | Hasbany | Sept. 29, 1953 |
| 2,689,029 | McFarland | Sept. 14, 1954 |
| 2,780,113 | Gates | Feb. 5, 1957 |

FOREIGN PATENTS

| | | |
|---|---|---|
| 617,972 | France | Mar. 1, 1927 |